(12) United States Patent
Squires (10) Patent No.: US 6,619,383 B2
(45) Date of Patent: Sep. 16, 2003

(54) VIBRATED-BED METHOD AND APPARATUS FOR HEAT EXCHANGE

(76) Inventor: Arthur M. Squires, P.O. Box 10098, Blacksburg, VA (US) 24062

( * ) Notice: Subject to any disclaimer, the term of this patent is extended or adjusted under 35 U.S.C. 154(b) by 27 days.

(21) Appl. No.: 09/911,388

(22) Filed: Jul. 25, 2001

(65) Prior Publication Data

US 2002/0011328 A1 Jan. 31, 2002

Related U.S. Application Data

(60) Provisional application No. 60/220,497, filed on Jul. 25, 2000.

(51) Int. Cl.⁷ ................................................. F28G 7/00

(52) U.S. Cl. .................... 165/84; 165/104.16; 122/4 D; 422/146

(58) Field of Search ....................... 165/104.15, 104.16, 165/104.17, 104.18; 422/145, 146, 147; 122/4 D (56) References Cited

U.S. PATENT DOCUMENTS

| | | | |
|---|---|---|---|
| 3,850,288 A | | 11/1974 | Musschoot |
| 3,921,590 A | * | 11/1975 | Mitchell et al. ............. 122/4 D |
| 4,036,598 A | * | 7/1977 | Soldate ...................... 23/288 B |
| 4,473,033 A | * | 9/1984 | Strohmeyer, Jr. .......... 122/4 D |
| 4,784,216 A | * | 11/1988 | Bracegirdle et al. .......... 165/84 |
| 5,676,201 A | * | 10/1997 | Klaren .................. 165/104.16 |

FOREIGN PATENT DOCUMENTS

| | | | |
|---|---|---|---|
| JP | 64-90031 A | * 4/1989 | ............ 165/104.16 |

OTHER PUBLICATIONS

Takahashi et al.; *Behavior of a Particle Bed in the Field of Vibration*; Powder Technology, vol. 2, (1968/69); pp. 65–71.

Squires et al.; *Fluid Beds: At Last, Challenging Two Entrenched Practices*; Science, vol. 230, No. 4732 (Dec. 20, 1985); pp. 1329–1337.

Sprung et al.; *Shallow Vibrated Beds*; Fluidization V, V. K. Ostergaard, Editor, Engineering Foundation, New York; pp. 409–416.

Thomas et al.; *A Method for Observing Phase–independent Phenonema in Cyclic Systems*; Powder Technology, vol. 52, (1987); pp. 77–92.

Thomas et al.; *Identifying States in Shallow Vibrated Beds*; Powder Technology, vol. 57 (1989); pp. 267–280.

Tshabalala et al.; *Effect of Axial Gas Dispersion on MTO Light: Microreactor Data*; AICcE Journal, vol. 42, No. 10, (Oct. 1996); pp. 2941–2947.

Fraas, Arthur P.; *Using vibrations in fluidized beds*; Mechanical Engineering, (Jan. 1998); pp. 76–79.

(List continued on next page.)

Primary Examiner—Henry Bennett
Assistant Examiner—Terrell McKinnon
(74) Attorney, Agent, or Firm—James Creighton Wray; Meera P. Narasimhan (57) ABSTRACT

A vibrated bed of particles is created by vibrating a chamber. Particles are flowed to a ceiling of the chamber and cascade through a gas flowing though the chamber, exchanging heat with the gas. Particles spouted to the ceiling spread there and cascade. Larger particles, raised above the ceiling by a lateral vibrated elevator, cascade from channels beneath openings in the ceiling. A plenum and tubes release protective gas through the vibrated bed. Tubes embedded in the vibrated bed move fluid to exchange heat with the particles in the vibrated beds. Serialized chambers are reversed and particles flow from one chamber to another.

33 Claims, 4 Drawing Sheets

OTHER PUBLICATIONS

Thomas et al.; *Support for Faraday's View of Circulation in a Fine–Powder Chladni Heap*; Physical Review Letters, vol. 81, No. 3, (Jul. 20, 1998); pp. 574–577.

Thomas et al.; *Heat transfer in shallow vibrated beds*; Powder Technology, vol. 99, (1998); pp. 293–301.

Thomas et al.; *Confirmation of Faraday's explanation of bunkering in vibrated granular beds*; Powder Technology, vol. 100 (1998); pp. 200–210.

Thomas et al.; *Some behaviors of shallow vibrated beds across a wide range in particle size and their implications for powder classification*; Powder Technology, vol. 111, (2000); pp. 34–49.

* cited by examiner

VIBRATED-BED METHOD AND APPARATUS FOR HEAT EXCHANGE

This application claims the benefit of U.S. Provisional Application No. 60/220,497 filed Jul. 25, 2000.

FIELDS OF THE INVENTION

The invention relates to a heat exchange between a gas and falling pulverulent matter.

BACKGROUND OF THE INVENTION

A common industrial operation entails recovery of heat from the combustion of a fuel or of "waste heat" from a chemical process. Such recovery often entails the cooling of a hot gas against water, the water being either heated or converted to steam. Conventional equipment for cooling a gas is often large in size, because coefficients of heat transfer from a gas to a metal surface, in general, are relatively small, e.g., only a few tens of watts/m$^2$-C. Achieving a high coefficient of heat transfer entails acceptance of a high pressure drop in the gas to be cooled. In practice, a balance must be struck between the capital expense for providing a larger heat exchanger and the running cost of a smaller exchanger, requiring higher pressure drop necessary in smaller equipment for it to perform the desired heat exchange.

Often, gas to be cooled is dirty, and in some instances, the dirt has properties causing it to foul heat-transfer surfaces with which the gas comes into contact. A notorious example is the off-gas from an electrometallurgical procedure for making ferrosilicon. This gas, as it enters a waste-heat boiler, contains an exceedingly fine fume of silicon dioxide, which fouls boiler surface so rapidly that a practice is to subject the surface to a shower of ball bearings every few minutes, cleaning it of adhering fume particles; yet even with this expedient, a larger boiler surface must be provided than would be necessary for cooling a clean gas. In some instances, a gas to be cooled contains a corrosive chemical species (such as hydrogen chloride), harmful to metal surfaces and over time reducing their effectiveness for transferring heat. Another notorious example arises in the manufacture of a fine titanium dioxide powder by burning titanium tetrachloride. It is difficult to maintain a reasonably continuous operation of the enormous "trombone" heat-exchanger now used for cooling products of this combustion.

Heterogeneously catalyzed reactions, in general, are carried out either in fixed beds of a granular catalyst or in fluidized beds of a catalyst powder. In the latter, control of reaction temperature is relatively easy, since coefficients of heat transfer from a fluid bed to surfaces embedded therein are generally high, often in the hundreds of watts/m$^2$-C. If, however, outcomes of a reaction are highly sensitive to axial gas dispersion (see Tshabalala and Squires, *AIChE Journal*, vol. 42, pp. 2941–2947, 1996), a fluid bed may not be a good choice. If a fixed bed must be specified, either a low coefficient of heat transfer from the reaction to surfaces within the bed must be accepted or a designer must adopt other expedients for controlling the bed temperature, such as employing a large gas recycle or injecting cold gas at intervals along the bed.

Herein, by the term "vibrated bed," I mean a bed of powder in a chamber with a floor, this floor being vibrated vertically at a vibrational intensity sufficient to cause the powder to display the "coherent-condensed vibrated-bed state" (see Thomas, Mason, Liu, and Squires, *Powder Technology*, vol. 57, pp. 267–280, 1989). In this "state," the powder becomes highly fluid. For example, application of only a small force is needed to move a stirring rod introduced into a vibrated bed from side to side. In general, intense vibration of a powder bed deeper than ~1 mm causes the powder to enter the coherent-condensed vibrated-bed state.

I now provide a definition of "vibrational intensity." I take the "null position" of the aforementioned floor to be its elevation when at rest. When it is subjected to a vertical sinusoidal vibration, its vertical displacement $\zeta$ from its null position is given by $\zeta = \alpha_0 \sin \overline{\omega} t$, where $\alpha_0$=the maximum displacement (called "amplitude" in the terminology of vibrated-bed engineering art); $\omega = 2\pi f$; t=time; and $f$=frequency. Vibrational intensity is the ratio of the floor's maximum acceleration to the acceleration of gravity, and is given by $\alpha_0 \overline{\omega}^2/g$. For coarse powders, the threshold vibrational intensity for creation of a vibrated bed is a little greater than 1.0; for fine powders, the theshold intensity can be considerably higher than 1.0. (See Thomas, Mason, Liu, and Squires, 1989.) In commercial practice, vibrational intensities greatly exceed these thresholds. Intensities as high as 15 are commonly used.

Industry employs vibrated beds extensively for drying particulate material. The beds are sometimes large, e.g., several meters in width and ten or more meters in length. Heat of drying is sometimes provided by indirect heat transfer across heat-exchange surface positioned within the drying bed. A vibrated bed presents coefficients of heat transfer comparable to those afforded by fluid beds (see Thomas, Mason, Sprung, Liu, and Squires, *Powder Technology*, vol. 99, pp. 293–301, 1998). Accordingly, the quantity of heat-exchange surface required for indirect heat transfer in a vibrated bed drier can be small. In other vibrated-bed driers, heat of drying is provided by direct heat transfer from a hot gas introduced into the bed from below (thereby creating an "aerated vibrated bed").

Little power is required for vibrating a vibrated-bed drier if it is spring-mounted and vibrated at a natural frequency of its mount. An aerated vibrated bed for drying a relatively coarse pulverulent solid can often require far less power than a fluid bed for drying the same solid. The velocity of hot gas across the aerated vibrated bed can be small relative to the velocity necessary to fluidize the coarse solid, and so power required for gas compression can be far below that needed to supply hot fluidizing gas to a fluid-bed drier for the same solid. Power required for vibration can be as little as 10% of that which a fluid-bed drier requires for gas compression.

The high heat-transfer coefficients generally afforded by vibrated beds make them, in principle, attractive candidate devices for heat-exchange applications other than for drying particulate materials. As a practical matter, how to use a vibrated bed for recovery of heat from a hot gas, for example, is not obvious. Contemplating use of a vibrated bed for this application, I hoped to develop a heat exchanger in which hot gas would flow horizontally across the surface of a bed in which heat-exchange surface is embedded (see Sprung, Thomas, Liu, and Squires, in *Fluidization V*, edited by V. K. Ostergaard, Engineering Foundation, New York, 1986, pp. 409–416). With proper choice of particle size and vibration parameters, the surface of the bed would be dilute (i.e., surface powder would display the diffuse "coherent-expanded vibrated-bed state"—see Thomas, Mason, Liu, and Squires, 1989). I hoped for an effective exchange of heat from the hot gas to the diffuse surface of the bed; or, failing that, I hoped that obliging the gas to flow through constrictions created by vertical baffles extending from the ceiling nearly to the bed's surface would cause a sufficient quantity of powder to become entrained in the gas, thereby cooling the gas. Unfortunately, the coefficient for transfer of heat from horizontally flowing gas to a vibrated-bed surface was disappointingly small; and, as well, providing the vertical baffles did not sufficiently improve the rate of heat transfer at an acceptable pressure drop in the gas.

SUMMARY OF THE INVENTION

My invention overcomes the shortcomings of my aforementioned idea.

In the invention, a duct of substantially rectangular cross-section houses a vibrated bed of a pulverulent material and a superjacent space. The invention employs the vibratory motion that creates the vibrated bed to lift pulverulent matter from the bed in a continuous flow to substantially the elevation of the ceiling of the duct. The invention also employs the vibratory motion to distribute the matter across the duct's ceiling, where the matter is allowed to fall into the aforementioned space. A gas is caused to flow horizontally along the space, the temperature of the gas being different from that of the pulverulent matter and, accordingly, exchanging heat therewith.

Two methods are available for employing the vibratory motion that creates the vibrated bed to lift the pulverulent matter to the elevation of the duct's ceiling. One method is useful if the pulverulent matter, generally speaking, is a fine powder. A second method is useful if the pulverulent matter is coarse. Below, I will specify more closely what I mean by the terms "fine powder" and "coarse powder."

I now describe the two methods in turn.

The Fine Powder Method

I have discovered that a spout of particles emerges spontaneously from a small-bore tube positioned vertically in a vibrated bed of a fine powder and extending from an elevation close to the floor of the chamber housing the bed to an elevation comparable to that of the surface of the bed (Thomas, Mason, and Squires, *Powder Technology,* vol. 111, pp. 34–49, September 2000).

I do not fully understand this new phenomenon, but I associate it with the variation in floor pressure, beneath a vibrated bed, that accompanies a vibration cycle. Early in a sinusoidal vibration cycle (that is to say, at a relatively low phase angle), the floor pressure falls below the ambient pressure at the bed's surface. Later (at a relatively high phase angle), the floor pressure exceeds the ambient. In general, the maximum positive deviation from floor pressure, late in the cycle, is much greater than the negative deviation, early in the cycle. More particularly, I associate the spouting phenomenon with the maximum positive pressure deviation occurring late in a vibration cycle. This deviation is a function of many variables, including vibrational intensity, density of the powder, depth of the powder bed, properties of the ambient gas, and (especially) the size of the powder. At the floor of a vibrated bed of a fine powder, the pressure deviation can be many times larger than it is for a coarse powder (see Thomas, Liu, Chan, and Squires, *Powder Technology,* vol. 52, pp. 77–92, 1987; Thomas and Squires, *Physical Review Letters,* vol. 81, pp. 574–577, 1998; and Thomas and Squires, *Powder Technology,* vol. 100, pp. 200–210, 1998). The discovery of spouting came about when a (conveniently at hand) small-bore tube was used to stir a vibrated bed of a fine powder, rather than a solid rod. The tube had a bore of 6 mm; its length was ~15 cm. At a vibrational intensity of ~6, the powder spouted to a distance amounting to a significant fraction of a meter. The powder was ~70 micrometers in size and had bulk and intrinsic densities of 740 and 2,570 kilograms/$m^3$, respectively. Spouts of this powder were seen at bed depths as small as ~2 cm. Whether a bed of a given particulate will spout is a function of tube bore and length as well as the aforementioned variables that influence the maximum positive pressure deviation. I have not been able to explore a sufficiently wide range of the variables to provide a guide for predicting when a spout will form and when it will not. From equipment limitations, I have not been able to study vibrational intensities higher than ~7 or beds deeper than ~5 cm. Large-scale commercial vibration equipment is available for vibrational intensities as high as 15.0. If such a high intensity is employed and if a bed deeper than 5 cm is specified, it is probable that useful spouts can be created over a wide range of the remaining relevant parameters. In the practice of my invention, experimentation on a small scale can readily determine whether a spout will form under whatever set of conditions is of interest.

Herein, by the term "fine powder," I mean a powder from which a useful spout can be created. In general, this will be a Group A powder in the Geldart classification (see Squires, Kwauk, and Avidan, *Science,* vol. 230, pp. 1329–1337, 1985).

The spouts of my discovery can be employed for lifting a fine powder from a vibrated bed of the invention to substantially the elevation of the ceiling of the duct. The vibration that created the vibrated bed is employed to create the spouts. This vibration is also employed to disperse powder transversely across the ceiling. For the latter objective, the vibrational intensity should be such that a spout colliding with the ceiling has a momentum sufficient to create a "cloud" of powder directly beneath the ceiling, within which powder moves laterally, and from which the powder is allowed to fall into the space.

The surface of a vibrated bed of a fine powder often displays heaps and depressions. The term of engineering art for the phenomenon is "bunkering"; the bed is said to "bunker." Desirably, however, a vibrated bed for practice of my invention should not bunker excessively. A downward flow of powder surrounds each spouting tube, and such flows mitigate against bunkering. In practice, providing a sufficient number of tubes should avoid excessive bunkering.

The Coarse Powder Method

Herein, by the term "coarse powder" I mean a powder that will not form a useful spout as described above. In general, this will be a Group B or D powder in the Geldart classification (see Squires, Kwauk, and Avidan, *op. cit.*).

A fact well known to practitioners of vibrated bed art is that powder tends to move upward along a side wall if the wall diverges outward toward higher elevations. See, for example, H. Takahashi, A. Suzuki, and T. Tanaka, *Powder Technology,* vol. 2, pages 65–71 (1968/69). A vertical lift conveyor (U.S. Pat. No. 3,850,288, Nov. 26, 1975) employs the phenomenon. Herein, I use the term "vibratory lift" to signify a powder lifting device of this general nature. A vibratory lift can be used to elevate a relatively coarse powder to a height comparable to that of the ceiling of the substantially horizontal duct hereinbefore described. The vibration can also be employed in various ways to spread the powder across the ceiling of the duct, wherein openings allow the powder to fall into the space above the vibrated bed of the invention.

Bunkering is less of a problem for a coarse powder than it is for a fine powder.

Commercially available, nearly spherical particles of a crude alumina (designated "Master Beads" by the manufacturer, Norton-Alcoa) are advantageously employed as the coarse powder in some applications of the invention. They are highly resistant to breakage, reducing their size, or to attrition, producing a fine powder. They are available in several sizes.

Advantages of the Invention

In conventional boiler plant raising steam for generation of power, fans (induced-draft) consume a significant fraction of the power generated. The fraction often approaches 5% of the power. Responsible for this loss of power is the pressure drop through a convective heat-exchanger conventionally used (following a radiative heat-recovery section of a boiler) to recover heat from combustion off-gas. A significant advantage of my invention is the exceptionally small pressure drop that gas will experience when exchanging heat with the falling powder.

Sometimes a need arises to recover heat from a hot gas containing a corrosive chemical species, such as hydrogen chloride. An embodiment of my invention can provide protection of metal heat-transfer surfaces from substantial exposure to this species. In general, there is an in-and-out traffic of gas across the surface of a vibrated bed. Early in each (sinusoidal) vibration cycle, ambient gas enters the bed and causes it to expand. In a relatively shallow bed (e.g., in general, shallower than ~25 cm), the gas penetrates all the way to the vibrating floor. (In beds of a relatively coarse powder, in general, the flow of ambient gas into the bed supplies gas for the formation of a "gap" between the floor and a "bottom surface" of the powder.) Later in the cycle, this gas leaves the bed. (In the aforementioned beds of the relatively coarse powder, the gap closes late in the cycle.) This in-and-out flow of ambient gas, however, can be prevented by "aerating" the bed, i.e., by causing gas to flow into the bed at a sufficient rate from a plenum beneath the vibrating floor. In my alternative embodiment, I introduce a non-corrosive gas (such as air) into the vibrated bed of my invention via tubes extending from such a plenum to a mid-elevation within the bed. With these tubes so disposed, the lower levels of the vibrated bed act as a non-aerated bed, ensuring (in the fine-powder embodiment) the production of spouts from the small-bore, vertical tubes, while aeration of the bed's upper levels substantially prevents penetration of the bed by the corrosive species.

OBJECTS OF THE INVENTION

An object of the invention is to provide a compact, non-fouling, long-lived, easily maintained heat exchanger for recovery of heat from a hot gas containing fume or dust or a corrosive chemical species.

Another object is to recover heat from a hot gas while causing only a small loss of pressure in the gas.

Another object is to provide a heat exchanger for control of temperature in a powdered catalyst promoting a chemical reaction.

Another object is to heat a powder.

Another object is to exchange heat between two gas streams.

Yet another object is to exchange heat from gaseous products of a combustion step to the oxygen-containing gas to be provided to this step, thereby heating this gas.

The invention relates to a heat exchange between a gas and falling pulverulent matter. The invention also relates to a double transfer of heat: a first exchange occurs between a gas and the falling pulverulent-matter; a second (transferring substantially the same quantity of heat) occurs between the matter and either a liquid or a second gas. The invention employs a coherent-condensed vibrated bed occupying the lower portion of a duct of generally rectangular cross-section. Gas flows in the horizontal direction through a space above the bed. Matter is conveyed from the bed to the elevation of the ceiling of the space, is distributed horizontally across the ceiling, and allowed to fall into the space. One object of the double heat exchange is to transfer heat from a hot gas to water. The gas may be a hot gas from combustion of a fuel. Alternatively, the gas may comprise chemical species capable of entering into a certain chemical reaction, the object of the exchange being to maintain a temperature favorable for this reaction in a space within which a catalyst is present with power to promote the reaction. In another alternative, a hot gas from combustion of a fuel may be cooled against a flow of air to be supplied to the combustion.

My invention relates to an improved method for exchanging heat between a gas and a pulverulent matter. The matter is introduced into a chamber having a substantially horizontal floor, a ceiling, a front wall, a back wall, and two side walls. The volume of the matter within the chamber is maintained at a volume that is significantly smaller than the volume of the chamber. Substantially vertical vibration is imparted to the chamber at a vibrational intensity sufficient to cause the matter to enter the coherent-condensed vibrated-bed state, thereby creating a vibrated bed that occupies a lower part of the chamber and a space that extends from the surface of the bed to the ceiling of the chamber. Matter is withdrawn from the vibrated bed and, through employment of the vibration, is elevated to substantially the elevation of the ceiling. Also through employment of the vibration, the elevated matter is distributed transversely across the ceiling. The distributed matter is permitted to fall through the aforementioned space. A gas is caused to enter the space across the front wall, to flow horizontally through the space, and to exit the space across the back wall, the gas having a temperature different from the falling matter and exchanging heat therewith.

My invention also relates to improved apparatus for the exchange of heat between a gas and a pulverulent matter. Means are provided for introducing matter into a chamber having a substantially horizontal floor, a ceiling, a front wall, a back wall, and two side walls. Means are provided for maintaining within the chamber a volume of the matter that is significantly smaller than the volume of the chamber. Means are provided for imparting substantially vertical vibration to the chamber at a vibrational intensity sufficient to cause the matter to enter the coherent-condensed vibrated-bed state, thereby creating a vibrated bed of the matter that occupies a lower part of the chamber and also creating a space that extends from the surface of the bed to the ceiling of the chamber. Means are provided for withdrawing the matter from the vibrated bed. Means are provided, through employment of the vibration creating the vibrated bed, for elevating the withdrawn matter to substantially the elevation of the ceiling. Means are also provided employing the vibration for distributing the elevated matter transversely across the ceiling. The distributed matter is permitted to fall through the aforementioned space. Means are provided for causing a gas to enter the space across the front wall, to flow horizontally through the space, and to exit the space across the back wall, the gas having a temperature different from the falling matter and exchanging heat therewith.

BRIEF DESCRIPTION OF THE DRAWINGS

The invention will be more particularly described in conjunction with the following drawings wherein.

DESCRIPTION OF THE PREFERRED EMBODIMENTS

Figure 1:
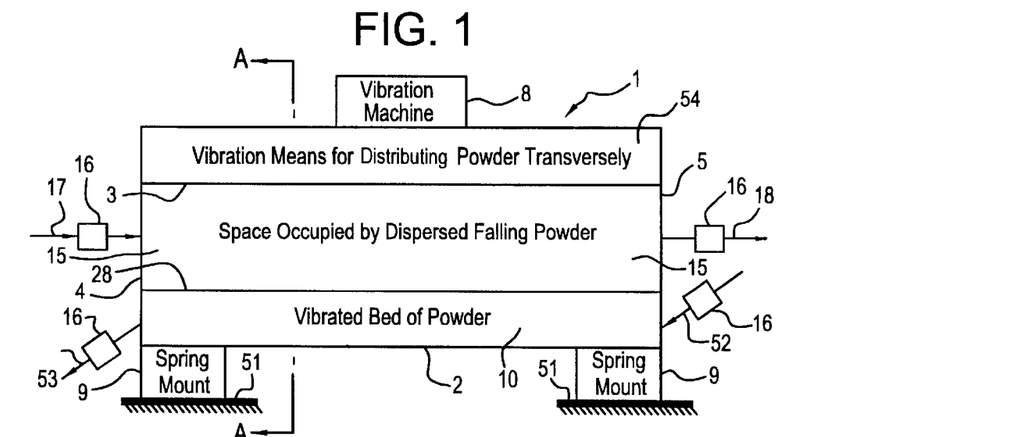
FIG. 1 is a vertical, longitudinal section view of my invention.
Figure 2:
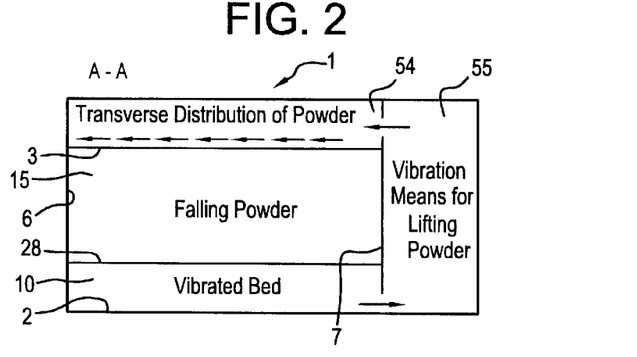
FIG. 2 is a vertical, transverse section view (through the cross-section A—A identified in FIG. 1). To help the reader appreciate the major features of the invention, the introductory drawings of FIGS. 1 & 2 present these features in highly schematic fashion.

In the several figures, like reference numerals refer to like parts having like functions. FIG. 1 is a highly schematic sketch of heat-exchanger 1, showing the exchanger in a longitudinal, vertical section. As shown in the figure, the heat-exchanger 1 chamber is of length appreciably greater than height. FIG. 2 is a similarly schematic sketch of 1 in a transverse, vertical section. Exchanger 1 comprises a chamber with floor 2, ceiling 3, front wall 4, back wall 5, and sidewalls 6 and 7 (the latter two walls are to be seen in FIG. 2).

If the temperature of gas in line 18 is significantly different from the temperature of gas in line 17, it is advantageous for the width of space 15 to vary. For example, if the line 18 temperature is significantly below the line 17 temperature, the distance between wall 6 and wall 7 is advantageously greater at front wall 4 than at back wall 5, so that the two side walls diverge from one another, the divergence being such that the velocity of gas flowing in space 15 does not vary significantly form front to back.

Powder bed 10 occupies a lower part of the chamber. Space 15 extends from the surface 28 of bed 10 to ceiling 3. Spring mounts 9, resting upon a stable support 51, carry heat-exchanger 1. Vibration-producing machine 8 (suitably an electric motor driving eccentric flywheels) causes heat exchanger 1 to vibrate substantially vertically at a vibrational frequency in substantial resonance with a natural frequency of vibration of spring mounts 9. The intensity of the vibration is sufficient to cause bed 10 to enter the coherent-condensed vibrated-bed state, the bed thereby becoming a "vibrated bed." Vibration means 55 (employing the vibration of chamber 1) lifts powder (withdrawn from bed 10 as indicated schematically in FIG. 2) to substantially the elevation of ceiling 3. Vibration means 54 (also employing the vibration of chamber 1) distributes the withdrawn powder transversely across ceiling 3. The distributed powder is permitted to fall by gravity through space 15. A gas (at a temperature different from that of the falling powder in space 15) enters space 15 from line 17 across front wall 4. The gas flows in a substantially horizontal direction through space 15, exchanging heat with the falling powder. The gas leaves the space across back wall 5 via line 18. Flexible couplings 16 connect stationary lines 17 and 18 with the vibrating chamber.

The exchanger of FIGS. 1 and 2 can be used to exchange heat between a continuous flow of a gas and a continuous flow of a powder. In such a usage, lines 52 and 53 are provided whereby the powder enters and exits bed 10. Attention must be paid to maintaining a relatively constant volume of powder in bed 10. That is to say, the flow of powder into the bed via line 52 must be modulated in accordance with a rise or a fall in the level of powder in bed 10.

A relatively constant volume of powder in bed 10 should also be maintained in applications (to be described below) for which lines 52 and 53 are omitted. In such applications, an appropriate volume of powder in bed 10 can be established on the first addition of powder to the bed, accompanied by minor additions from time to time as the level of powder in the bed may rise or fall.

Figure 3:
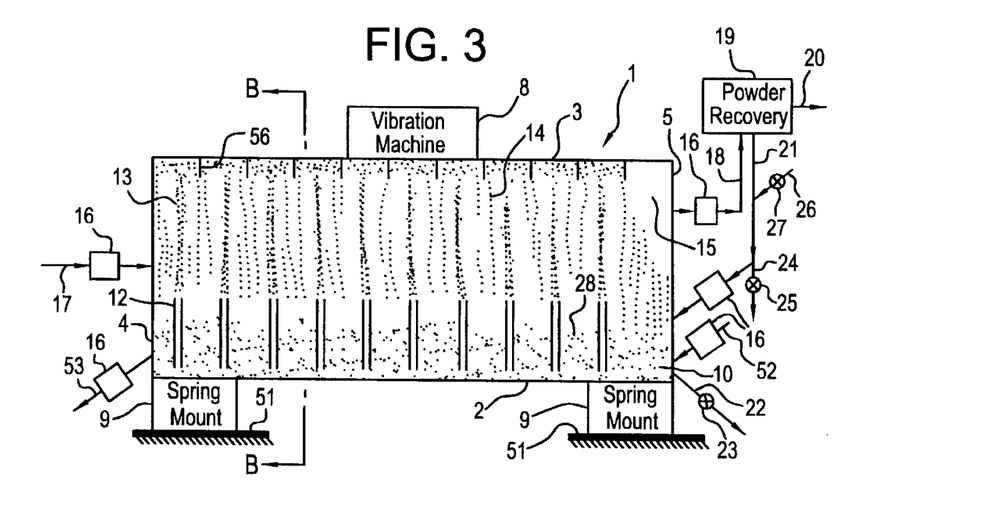
FIGS. 3 and 4 are sectional views (longitudinal and transverse, respectively) of an embodiment of the invention for exchanging heat between a flow of a gas and a flow of a fine powder.
Figure 4:
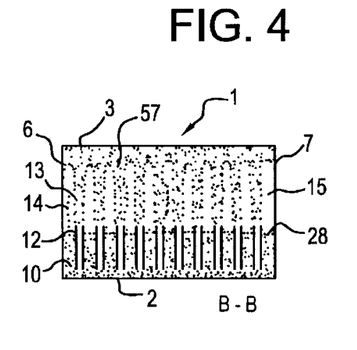

The drawings of FIGS. 3 and 4 (longitudinal and transverse vertical sections, respectively) illustrate an embodiment of the invention that employs a fine powder in bed 10. Small-bore, vertical tubes 12 extend upward from an elevation near floor 2. The number of tubes 12 is such that bunkering (if any) is moderate. Spontaneously, powder erupts from each vertical tube 12 to form a spout 13. The vibrational intensity imparted by vibrated machine 8 is sufficient to cause each spout 13 to collide with ceiling 3, the powder possessing sufficient momentum that the collision with the ceiling distributes the powder laterally along the underside of the ceiling. Transverse, vertical baffles 56 extend a short distance from ceiling 3 into space 15, tending to limit powder distribution in the longitudinal direction. FIG. 4 illustrates the transverse distribution of powder in a "cloud" of the powder, 57, created by the collision of spouts with the ceiling. The powder tends to fall through space 15 in form of strands 14 (or in clumps or in "sheets" resembling the falling of water droplets in a heavy rainstorm).

Notice that a temperature gradient may exist in the longitudinal direction along bed 10 (i.e., between wall 4 and wall 5). Although some longitudinal mixing of powder will occur in bed 10, in general the degree of mixing will be insufficient to prevent the development of a gradient in the temperature. A large degree of mixing would limit the amount of heat that could be transferred between the gas and the powder. If in practice the degree of mixing were to be undesirably great, transverse baffle means could be provided to limit longitudinal mixing of powder in bed 10.

Gas (either heated or cooled by heat exchange with powder entering bed 10 via line 52 and leaving via line 53) leaves heat-exchanger 1 via pipe 18, entering powder collector 19, from which substantially powder-free gas exits via pipe 20. Powder separated from the gas in 19 is returned to heat-exchanger 1 via line 21.

If the gas entering space 15 from line 17 is hot and contains a fine dust, the dust tends to collect upon surfaces of powder falling through space 15. Optional lines 22 and 24 (fitted with valves 23 and 25, respectively, for control of flows therein) may be provided for periodic withdrawal of powder contaminated with dust; and optional line 26 (fitted with valve 27 for control of flow therein) is provided for adding clean powder to make good the withdrawals via 22 and 24.

Figure 5:
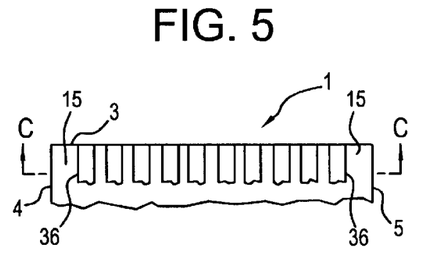
FIG. 5 is a vertical, longitudinal partial section view of an alternative embodiment.
Figure 6:
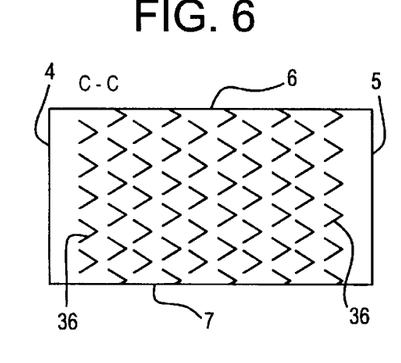
FIG. 6 is a horizontal section view of this alternative (through the section C—C identified in FIG. 5).

FIG. 5 is an upper, partial view (in a vertical cross-section) of an alternative heat-exchanger 1 for use with a fine powder. In the alternative, vertical baffles 36 are provided, each baffle tending to cause powder to fall back promptly from space 15 and return to bed 10. The object of the baffles is to minimize the conveying of the powder longitudinally by the gas. FIG. 6 shows horizontal section C—C as indicated in FIG. 5. Baffles 36 are V-shaped in horizontal cross-section, the point of the V heading away from the direction of flow of gas from front wall 4 toward back wall 5. Each baffle tends to create a "quiet zone" in front of the point of the V, down which powder tends to fall.

Figure 7:
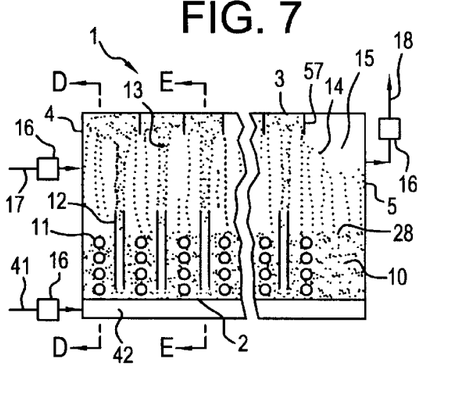
FIGS. 7, 8, & 9 sketch an embodiment of the invention for exchanging heat between a gas and a liquid, with use of a fine powder as a heat-carrying intermediary in the exchange.
Figure 8:
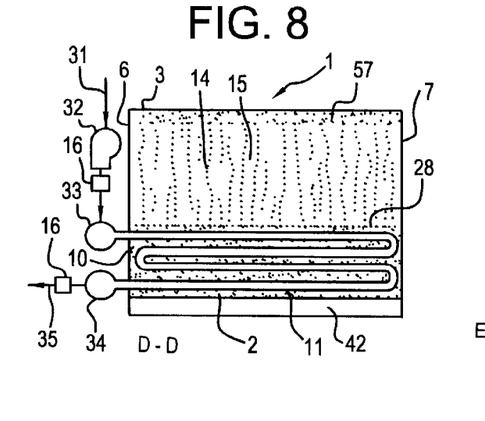
Figure 9:
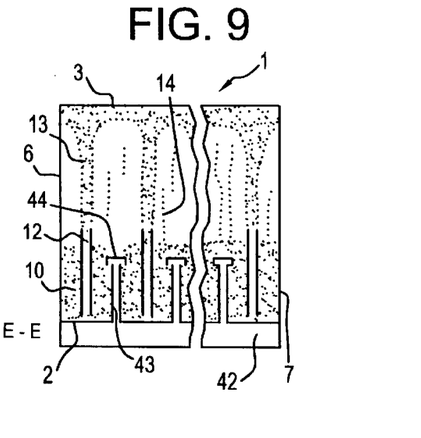
Figure 10:
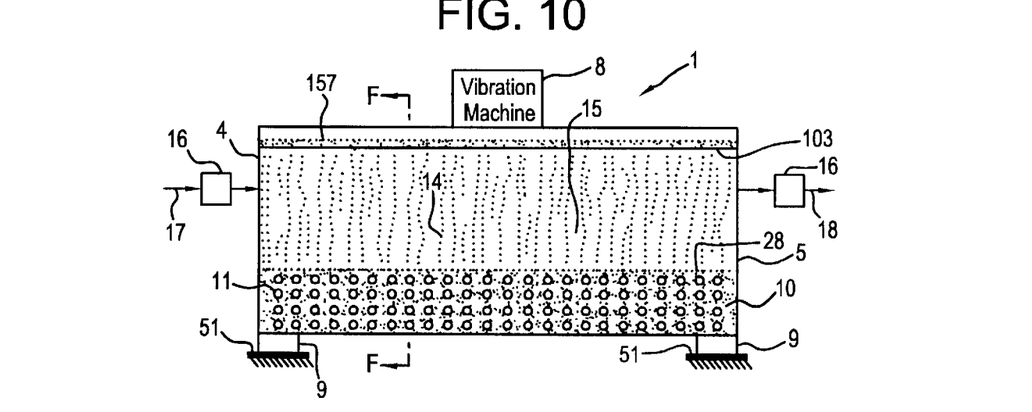
FIGS. 10, 11, 12, and 13 sketch an embodiment of the invention for exchanging heat between a gas and a liquid, with use of a coarse powder as a heat-carrying intermediary in the exchange.

FIGS. 7, 8, and 9 sketch an embodiment useful for recovering heat from a hot gas, which enters space 15 from line 17. Heat-transfer pipes 11 are positioned near the vertical tubes 12. Water is introduced into the pipes 11 via line 31 and header 33, the latter providing water to pipes 11.

The falling powder acts as an intermediary promoting a transfer of heat to the water from a hot gas flowing horizontally along space 15. Heat is transferred from gas to falling powder strands 14, raising their temperature. Returning to bed 10, the strands give up their heat to the bed. In turn, this heat is transferred across outer and inner surfaces of pipes 11 and enters water flowing through these pipes. Header 34 receives heated water (or steam) from the pipes 11, and water (or steam) leaves header 34 via line 35. Pump 32 is provided to cause water to flow through the pipes 11.

If an ultra-fine dust is present in the hot gas from line 17 (e.g., the silica fume in gas from ferrosilicon production), there is little or no tendency for the dust to foul the external surfaces of pipes 11. A large part of such ultra-fine dust adheres to larger particles of the powder; and there is a scrubbing action of powder in vibrated-bed 10 against these external surfaces, tending to remove any dust that might temporarily adhere thereto.

Heat-exchanger 1 of FIGS. 7, 8, and 9 may also serve as a reactor for conducting a heterogeneously catalyzed reaction. A powder having catalytic virtue for the reaction is provided to constitute bed 10, and the heat exchange can serve to maintain a temperature suitable for the reaction in space 15. Gas flowing from wall 4 to wall 5 experiences small axial dispersion (i.e., dispersion in the horizontal direction) relative to that experienced by gas traversing a large fluid bed.

If the hot gas entering space 15 from pipe 17 contains a corrosive chemical species, such as hydrogen chloride, it will be advantageous to supply a non-corrosive gas from optional line 41 into optional plenum 42 situated beneath floor 2. Optional tubes 43 (see in FIG. 9) carry this gas from plenum 42 into a mid-elevation of bed 10 The effect of the introduction of the non-corrosive gas into bed 10 is to reduce the exposure of heat-exchange pipes 11 to corrosive species in the hot gas reaching space 15 from pipe 17. In absence of plenum 42 and tubes 43, corrosive species from space 15 would enter bed 10 via a cyclic flow of gas, into bed 10 from space 15 and back out again, this cyclic flow occurring during each vibration cycle. Desirably, a tube 43 is fitted at its top end with an inverted cup or "hat" 44, which prevents powder from entering the tube from bed 10.

The embodiment of FIGS. 7, 8, and 9 should also be useful as a reactor for a heterogeneously catalyzed reaction where it would be advantageous to subject a powdered catalyst periodically to a "regenerative" treatment. For example, in conducting Fischer-Tropsch synthesis over an iron catalyst, it should be feasible to employ a synthesis gas at a lower ratio of hydrogen content to carbon monoxide content (yet avoiding problems arising from formation of carbon and catalyst decrepitation) if the iron catalyst were exposed to synthesis gas (entering heat-exchanger 1 in FIG. 7 from pipe 17) for only the relatively short time interval during which the catalyst is present in space 15, while exposing the catalyst for a much longer time in bed 10 to a gas rich in hydrogen, supplied via pipe 41. Notice that a flow of the hydrogen rich gas from pipe 41 may advantageously be much smaller than the flow of low $H_2:CO$ synthesis gas from pipe 17, yet hydrogen treatment during a catalyst particle's relatively long residence time in bed 10 may "scavenge" nascent carbon formed upon the catalyst during its brief exposure to synthesis gas (and, as well, may reduce yields of heavy oils and waxes in favor of products in the gasoline range). Methane oxidation and oxychlorination provide other examples where an intermittent "regenerative" catalyst treatment should be useful.

It should be pointed out that the embodiment of FIGS. 3 and 4 may also be used for conducting a catalytic reaction, if the fine catalyst powder is circulated through bed 10 via lines 52 and 53, the temperature of bed 10 and powder falling in space 15 being controlled by maintaining an appropriate temperature in line 52. Such maintenance may be accomplished, of course, through a variety of means for exchanging heat with powder in line 53 (including a heat-exchanger of the instant invention).

Figure 11:
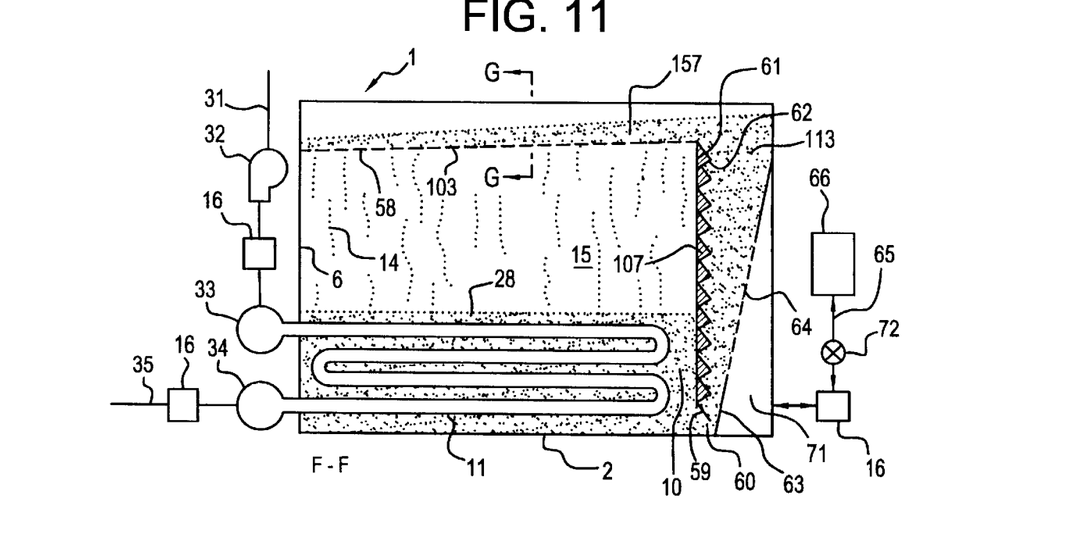
Figures 12, 13:
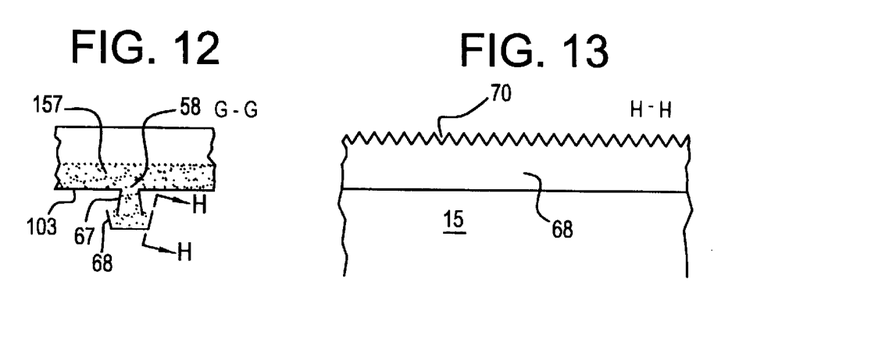

FIGS. 10, 11, 12, and 13 depict an embodiment for use with a coarse powder. Asymmetrical serrations, running longitudinally in respect to space 15, are provided on this space's side wall 107, each serration having a longer surface 61 facing upward and a shorter surface 62 facing downward, the two surfaces articulated with one another at substantially a right angle. The serrations, as shown in FIG. 11, are present on the side of 107 facing away from space 15. Side wall 107 has a slot opening 60 near the bottom of vibrated bed 10 and running longitudinally in respect to space 15 and bed 10. The upper edge of opening 60 is the lower edge of baffle 59 articulating with side wall 107 and inclined at an angle substantially parallel with upper surfaces 61 of the aforesaid asymmetrical serrations. Inclined outwardly in respect to wall 107, and opposite the asymmetrical serrations of 107, is wall 63. Vibrated bed 113 generally occupies the space between the asymmetrically serrated side of wall 107 and wall 63. The latter two elements cooperate with slot-opening 60 and baffle 59 in an implementation of the vibration of exchanger 1 that lifts powder from bed 10 to substantially the elevation of ceiling 103. In other words, elements 107, 59, 60, 61, 62, and 63 constitute a vibratory lift conveying powder upwardly in bed 113 and delivering the powder to vibrated bed 157 resting upon the upper side of ceiling 103 of space 15. Ceiling 103 is sloped downwardly from its articulation with side wall 107 toward its articulation with side wall 6. Through this downward slope, the vibration of exchanger 1 is implemented to cause powder in bed 157 to distribute transversely across ceiling 103. Slot-perforations 58 in ceiling 103 permit the distributed powder to fall into space 15. Perforations 58 extend transversely across the ceiling, as illustrated generally in FIG. 11 and more particularly in FIG. 12. Baffles 67 extend downward from the edges of slot-perforation 58, and lean away from these edges. Channel 69 is situated beneath the lower edges of baffles 67. Notches 70 comprise the upper edge of each side wall 68 of channel 69, as seen in FIG. 13. Powder moves downward from bed 157 through slot 58 and spills into space 15 via the notches 70.

If it is preferred that the ceiling 103 be level, an alternative can be suggested for causing powder to move across the ceiling's upper surface. In this alternative, the surface would carry asymmetrical serrations running longitudinally, the orientation of a serration being such as to cause powder to move transversely across the ceiling. In general, this alternative is more complicated mechanically and will usually be more costly to provide than the preferred alternative sketched in the figures.

Optionally, a mid-portion 64 of wall 63 is perforated, as seen in FIG. 11. Space 71 behind wall 63 communicates with a gas source 66 via line 65. Valve 72 controls the pressure in space 71 at a level substantially equal to the pressure in space 15 by allowing gas to flow, as necessary, either into or from space 71. If the mid-portion 64 is perforated, the vibratory lift of FIG. 11 can be employed using powders at sizes smaller than the sizes that otherwise can be specified.

Figure 14:
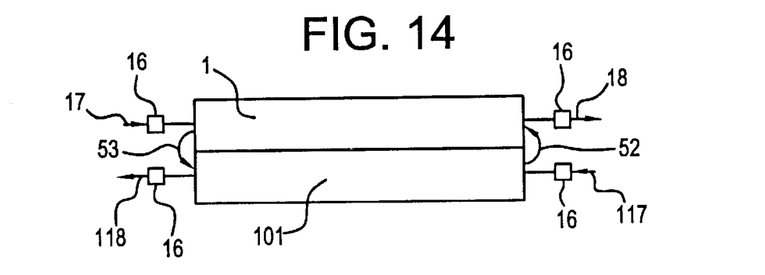
FIG. 14 illustrates how the invention may be used to exchange heat between two gases.

FIG. 14 illustrates how two side-by-side heat exchangers of the invention, 1 and 101, can be used to exchange heat between two gases, for example by heating air to be supplied to a combustion step by heat exchange between the air and hot gaseous products from this step. A first gas enters exchanger 1 from line 17. Powder at a lower temperature enters exchanger 1 via line 52. Heat is exchanged in exchanger 1 between the first gas and the solid. The first gas leaves exchanger 1 via line 18. Powder leaves exchanger 1 via line 53, which delivers the powder to exchanger 101. A second gas enters exchanger 101 from line 117 and leaves via line 118. Powder leaves exchanger 101 via line 52, which delivers the powder to exchanger 1.

Figure 15:
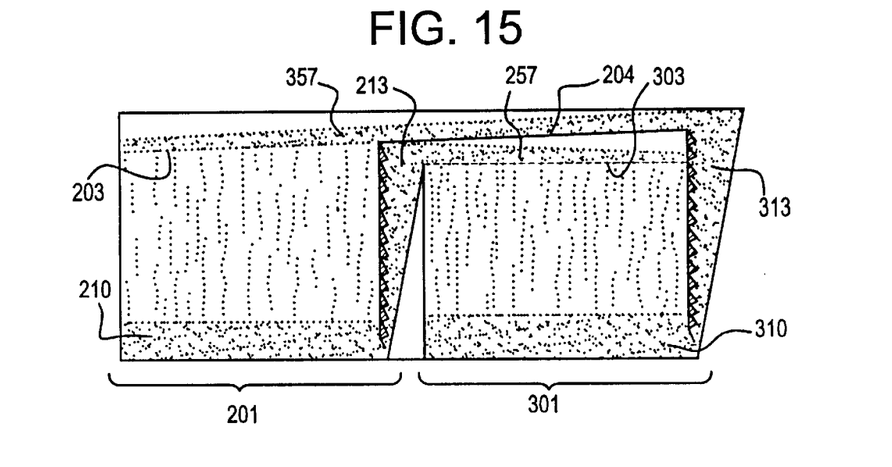
FIG. 15 illustrates an alternative arrangement for exchanging heat between two gases, with use of a coarse powder as a heat-carrying intermediary in the exchange.

FIG. 15 is a transverse cross-section of an alternative arrangement, useful in an application of the invention using a coarse powder, for exchanging heat between two gases. Exchangers 201 and 301 are mounted side-by-side. By means of a vibratory lift, powder from vibrated bed 210 of exchanger 201 is lifted via bed 213 to bed 257, which rests upon ceiling 303 of exchanger 301; and powder falls from ceiling 303 onto bed 310. Similarly, powder from bed 310 is lifted via bed 313 onto inclined surface 204, which articulates with ceiling 203 of exchanger 201.

Figure 16:
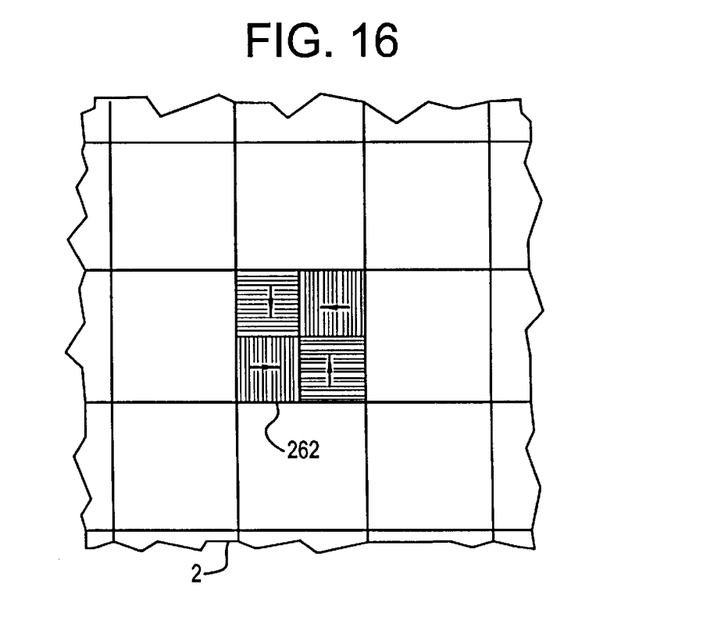
FIG. 16 is a plan view of a floor appropriate for the chamber of the invention in the embodiments of FIGS. 7 and 10.

I do not wish my invention to be limited to the preferred embodiments illustrated by the figures. Although for practice of my invention, vibration of heat-exchanger 1 should be substantially vertical, I do not rule out use of complex-mode vibrational patterns that create swirl within bed 10 (see Fraas, *Mechanical Engineering,* vol. 120, No. 1, pp. 76–79, 1998). Complex-mode vibration can significantly increase the coefficient for transfer of heat between bed 10 and pipes 11 (see Thomas, Mason, Sprung, Liu, and Squires, 1998). FIG. 16 generally illustrates another method for creating swirl. The drawing in FIG. 16 is a schematic plan view of a floor 2 in which asymmetrical serrations 262 are disposed in a checker-board fashion, the asymmetries being oriented in the several squares to cause a swirl flow of the powder in directions indicated by arrows in the square located centrally in the drawing.

I claim:

1. Apparatus for exchanging heat between a gas and a pulverulent matter, comprising:

a chamber having a substantially horizontal floor, a ceiling, a front wall, a back wall, and two side walls;

means for introducing said pulverulent matter into said chamber;

means for maintaining within said chamber a volume of said powder that is significantly smaller than the volume of said chamber;

means for imparting a substantially vertical vibration to said chamber at a vibrational intensity sufficient to cause said matter to enter a coherent-condensed vibrated-bed state, thereby creating a vibrated bed that occupies a lower part of said chamber and a space that extends from the surface of said bed to said ceiling;

means for withdrawing matter from said vibrated bed;

means for a first employment of said vibration, elevating said withdrawn matter to substantially the elevation of said ceiling;

means for a second employment of said vibration, distributing said elevated matter across said ceiling in a direction generally perpendicular to said side walls;

an arrangement that permits said distributed matter to fall through said space;

means for causing a gas to enter said space across said front wall, to flow horizontally through said space, and to exit said space across said back wall, the said flowing gas having a temperature different from said falling matter and exchanging heat therewith.

2. Heat exchanger apparatus comprising:

a horizontal chamber having a length greater than a height of the chamber;

solid particles in the chamber;

a vibrator connected to the chamber for creating a vibrated bed of the particles and leaving a space in the chamber above the vibrated bed;

an elevator connected to the container for elevating the particles upward from the vibrated bed and for cascading the particles downward through the space to the vibrated bed;

a gas supplier positioned at one end of the chamber in communication with the space for supplying gas horizontally to the space for contacting and exchanging heat with the cascading particles; and a gas remover positioned at an opposite end of the chamber in communication with the space for removing gas from the space after contacting the horizontally flowing gas and exchanging heat with the cascading particles.

3. The apparatus of claim 2, wherein the chamber further comprises a ceiling; and wherein the particles cascade from the ceiling.

4. The apparatus of claim 2, further comprising tubes extending between the space and the vibrated bed for spouting particles from the vibrated bed to the ceiling.

5. The apparatus of claim 3, further comprising baffles extending downward from the ceiling.

6. The apparatus of claim 5, wherein the baffles have V-shaped horizontal cross-sections.

7. The apparatus of claim 3, wherein the ceiling has openings; and wherein the particles cascade downward from the openings in the ceilings.

8. The apparatus of claim 7, further comprising a vibrated elevator connected to a side of the chamber for elevating the particles upward along the side of the chamber and over the ceiling.

9. The apparatus of claim 8, wherein the ceiling is sloped downward away from the elevator and over the chamber.

10. The apparatus of claim 7, further comprising upward opening channels positioned beneath the ceiling openings, the upward opening channels having sloped side walls with notched edges for cascading the particles through the notched edges.

11. The apparatus of claim 2, further comprising a plenum beneath the chamber;
   tubes extending upward in the vibrated bed from the plenum; and
   a gas source connected to the plenum for releasing gas through the tubes into the vibrated bed.

12. The apparatus of claim 2, further comprising tubes embedded in the vibrated bed; and
   a fluid source and a fluid return connected to the tubes for exchanging heat between fluid in the embedded tubes and the particles in the vibrated bed.

13. A method of heat exchange between a first gas and a second gas, comprising:
   providing a first duct having a substantially horizontal floor, a ceiling, a front and back wall, and side walls;
   alongside said first duct, providing a second duct having a substantially horizontal floor, a ceiling, a front and back wall, side walls, and a volume substantially equal to the volume of said first duct, the front wall of said first duct being nearby the back wall of said second duct, the back wall of said first duct being nearby the front wall of said second duct, the ceiling of each said duct being downwardly inclined from a first side wall of said duct to a second side wall of said duct;
   introducing a volume of a coarse powder into each said duct, said volume being smaller than the volume of said ducts;
   imparting substantially vertical vibration to said ducts at a vibrational intensity sufficient to cause said powder to enter the coherent-condensed vibrated-bed state, thereby creating a first and a second vibrated bed occupying, respectively, a lower part of said first and second duct, and also creating a first and a second space extending, respectively, from the surface of said first and second bed to the ceiling of said first and second duct;
   providing an opening in a side wall of each said duct nearby the floor of said duct, said opening communicating with a vibratory lift that elevates powder exiting said opening to the elevation of said ceilings, the elevated powder originating from said first duct being supplied to the upper surface of the ceiling of the second duct near the juncture of said ceiling with said first side wall of said second duct, the elevated powder originating from said second duct being supplied to the upper surface of the ceiling of the first duct near the juncture of said ceiling with said first side wall of said first duct, said elevated powder thereby entering vibrated beds that rest upon said upper surfaces, said downward inclination of said ceilings causing said vibrated beds to move transversely across said ceilings, and said openings in said ceilings allowing powder to fall into said spaces, thereby creating an exchange of powder between the two said spaces;
   causing a first gas to enter the space in said first duct across the front wall of said duct, to flow horizontally through said space, and to exit said space across the back wall of said duct;
   causing a second gas at a temperature different from that of said first gas to enter the space in said second duct across the front wall of said duct, to flow horizontally through said space, to exit said space across the back wall of said duct, and said exchange of powder between the two said spaces accomplishing a heat exchange between the two said gases.

14. A method of heat exchange between a gas and a pulverulent matter, comprising:
   introducing said matter into a chamber having a substantially horizontal floor, a ceiling, a front wall, a back wall, and two side walls;
   maintaining within said chamber a volume of said powder that is significantly smaller than the volume of said chamber;
   imparting substantially vertical vibration to said chamber at a vibrational intensity sufficient to cause said matter within said chamber to enter the coherent-condensed vibrated-bed state, thereby creating a vibrated bed that occupies a lower part of said chamber and a space that extends from the surface of said bed to said ceiling;
   withdrawing matter from said vibrated bed;
   through a first employment of said vibration, elevating said withdrawn matter to substantially the elevation of said ceiling;
   through a second employment of said vibration, distributing said elevated matter across said ceiling in a direction generally perpendicular to said side walls;
   permitting said distributed matter to fall through said space;
   causing a gas to enter said space across said front wall, to flow horizontally through said space, and to exit said space across said back wall, the said flowing gas having a temperature different from said falling matter, and exchanging heat therewith.

15. The method of claim 14 including:
   supplying said pulverulent matter to said vibrated bed at a location nearby said back wall;
   changing a temperature of the supplied matter by contact with the gas, and
   withdrawing said pulverulent matter at a location nearby said front wall, said withdrawn matter having attained a temperature different from that of said supplied matter.

16. The method of claim 14 including:
   positioning conduits within said vibrated bed, said conduits having external and internal surfaces;
   causing a fluid to flow through said conduits, said fluid being at a temperature different from said matter in said vibrated bed, thereby causing heat to be transferred between said bed and said fluid.

17. The method of claim 16 in which said gas is hot, said transfer of heat serving to cool said gas.

18. The method of claim 17 in which said fluid is water.

19. The method of claim 16 in which said pulverulent matter is a catalyst capable of promoting a chemical reaction and said gas comprises the chemical species capable of entering into said reaction, said transfer of heat serving to maintain a temperature in said space favorable for the occurrence of said reaction.

20. The method of claim 16 in which said gas entering said space is a first gas and including:
   providing circular openings in said floor;
   providing a plenum beneath said floor;
   providing substantially vertical tubes that extend from said openings to a mid-elevation within said vibrated bed, the tops of said tubes being open-ended;
   supplying a second gas to said plenum, thereby reducing the penetration of said first gas into the interior of said vibrated bed.

21. The method of claim 14 in which said pulverulent matter is a fine powder and said distribution of said elevated matter occurs on the underside of said ceiling, including:

said first employment comprising the positioning a number of small-bore, substantially vertical tubes, each extending upward from an elevation near said floor and terminating significantly short of said ceiling, a spout of said fine powder emanating from the top of each said tube, and said second employment comprising usage of a sufficient vibrational intensity to cause each said spout to collide with said ceiling at a momentum creating a lateral distribution of said emanated powder on said underside of said ceiling.

22. The method of claim 14 in which said pulverulent matter is a coarse powder and said distribution of said elevated matter occurs on the upper surface of said ceiling, including:

providing a multiplicity of openings in said ceiling;

said first employment comprising the providing of an opening in a first side wall nearby said floor, said opening communicating with a vibratory lift that elevates matter exiting said vibrated bed via said opening to the elevation of said ceiling; and said second employment comprising the providing of a transversely downward slope of said ceiling in the direction from said first said wall toward the second side wall, there being created a vibrated bed resting upon said ceiling, said downward slope causing said vibrated bed to move transversely across said ceiling, and said openings in said ceiling allowing the coarse powder to fall into said space.

23. Heat-exchange method comprising:

partially filling a horizontal chamber with solid particles, the chamber being of length appreciably greater than height;

vibrating the chamber vertically at an intensity creating a vibrated bed of the particles in the chamber but leaving a space within the chamber above the vibrated bed;

elevating the particles upward from the vibrated bed;

cascading the particles downward through the space to the vibrated bed;

supplying gas at one end of the space; and removing gas at an opposite end of the space, the horizontally flowing gas having exchanged heat with the cascading particles.

24. The method of claim 23, wherein particles cascade from the ceiling of the chamber.

25. The method of claim 23, wherein particles spout vertically from the vibrated bed into the space through tubes extending from within the vibrated bed to an elevation above the bed.

26. The method of claim 23, wherein the gas flowing horizontally from one end of the space to the opposite end encounters vertical baffles.

27. The method of claim 26, in which the baffles are V-shaped in horizontal cross-section.

28. The method of claim 24, wherein particles cascade downward from openings in the ceiling.

29. The method of claim 28, wherein particles are elevated in a vibratory elevator from within the vibrated bed to the elevation of the ceiling.

30. The method of claim 29, wherein the ceiling is downwardly sloping and the elevated particles form a vibrated bed thereupon.

31. The method of claim 28, wherein particles flow through notched edges of upwardly opening channels positioned beneath the ceiling openings.

32. The method of claim 23, wherein a gas is supplied to a plenum beneath the chamber, the gas entering the vibrated bed at a mid-elevation therein via tubes extending upward from the plenum.

33. The method of claim 23, wherein particles of the vibrated bed exchange heat with a fluid flowing through tubes embedded therein.

* * * * *